United States Patent
Hearn

[11] 3,729,251
[45] Apr. 24, 1973

[54] ACOUSTO-OPTIC FILTER HAVING ELECTRICALLY VARIABLE RESOLUTION

[75] Inventor: John R. Hearn, Los Altos Hill, Calif.

[73] Assignee: Hewlett-Packard Company, Palo Alto, Calif.

[22] Filed: June 16, 1971

[21] Appl. No.: 153,787

[52] U.S. Cl. .............................. 350/149, 350/157
[51] Int. Cl. ........................................ G02f 1/24
[58] Field of Search .................. 350/149, 150, 157, 350/160, 161; 324/78 F; 331/77

[56] References Cited

UNITED STATES PATENTS

| 3,632,193 | 1/1972 | Kusters | 350/149 |
| 3,614,204 | 10/1971 | Pinnow et al. | 350/161 |
| 3,307,408 | 3/1967 | Thomas et al. | 324/78 F |
| 3,626,315 | 12/1971 | Stirling et al. | 331/77 |
| 3,450,990 | 6/1969 | Green et al. | 324/78 F |
| 3,667,038 | 5/1972 | Cutler et al. | 350/149 X |

Primary Examiner—John K. Corbin
Attorney—A. C. Smith

[57] ABSTRACT

The optical bandpass or band reject of an acousto-optic filter is tailored in width and amplitude by tailoring the width and amplitude of a band of radio frequency acoustic waves excited in the photoelastic birefringent filter medium and on which the light beam is collinearly diffracted to produce the output light beam of the acousto-optic filter.

4 Claims, 5 Drawing Figures

Patented April 24, 1973
3,729,251
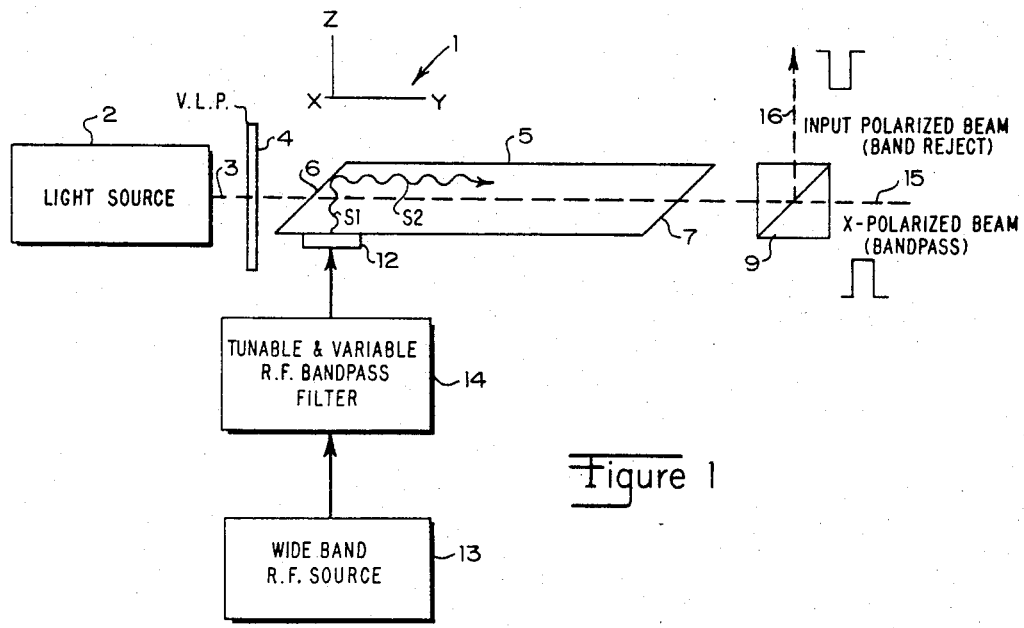
Figure 1
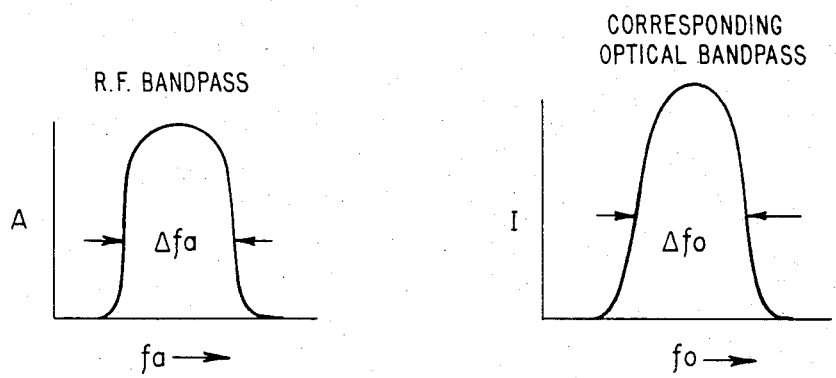
Figure 2
Figure 3
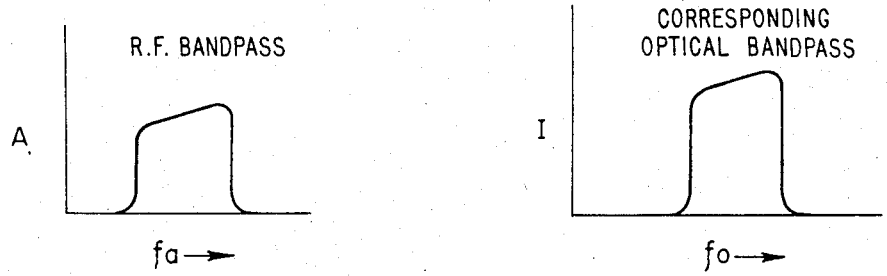
Figure 4
Figure 5
INVENTOR
JOHN R. HEARN
BY Q. C. Smith
ATTORNEY

ACOUSTO-OPTIC FILTER HAVING ELECTRICALLY VARIABLE RESOLUTION

DESCRIPTION OF THE PRIOR ART

Heretofore, electronically tunable acousto-optic bandpass filters have been constructed wherein light of a first polarization was collinearly diffracted on an acousto-optic wave in a photoelastic optically in-isotropic medium, such as a birefringent crystal, to shift the polarization of the light beam at a selected bandpass of optical frequencies from a first polarization to a second polarization. The diffracted light was polarization analyzed to pass the light of the second polarization and to exclude or reject light of the first polarization. The bandpass characteristic of the acousto-optic filter was electrically tunable by varying the frequency of the acoustic wave within the birefringent crystal.

However, the acoustic wave within the crystal was essentially only a single frequency and produced a relatively narrow passband at the optical frequency. For example, for an acoustic wave of a single frequency, the output passband at optical frequencies corresponded to a bandwidth of approximately 2A. in the visible range. Such an acousto-optic filter is disclosed in an article titled "Acousto-Optic Tunable Filter" appearing in the Journal of the Optical Society of America, Vol. 59, No. 6 of June of 1969, pages 744–747, and in an article titled "Electronically Tunable Acousto-Optic Filter" appearing in the Applied Physics Letters, Vol. 15, No. 10, of Nov. 15, 1969, pages 325 and 326.

While the electronically tunable acousto-optic bandpass filter is useful in many applications, its passband width at optical frequencies has heretofore been determined by the parameters of the birefringent crystal. More specifically, the passband width is inversely proportional to the length of the crystal and proportional to the birefringence of the crystal. Once the crystal is cut for a given filter, the passband has not heretofore been variable. In some applications for an acousto-optic filter, such as in a monochromator, spectrometer or spectrophotometer, it may be desirable to broaden the passband of the filter and to make this passband width variable over the tunable range of the filter in a certain manner. Some crystals, over their tuning range, have a passband width which is not uniform from one end of the tuning range to the other. It would be desirable to have means for variably controlling the passband of the filter such as to obtain, for example, uniform width of the optical passband over the tunable range of the filter.

SUMMARY OF THE PRESENT INVENTION

The principal object of the present invention is the provision of an acousto-optic filter having electrically variable resolution.

In one feature of the present invention, the optically birefringent medium of the acousto-optic filter is excited with acoustic waves simultaneously over a band of radio frequencies such that the optical band of the acousto-optic filter is increased compared to the bandwidth obtained when the crystal is excited with an acoustic wave of only a single radio frequency.

In another feature of the present invention, the bandwidth of simultaneously excited radio frequency acoustic waves in the birefringent medium is varied to produce a corresponding variation in the optical bandwidth of the acousto-optic filter.

In another feature of the present invention, the band of radio frequency acoustic waves excited in the birefringent medium are derived by generating a band of simultaneously excited radio frequency electromagnetic waves wider than the desired band of acoustic waves and filtering out of the band of radio frequency waves, a band of electromagnetic waves of a bandwidth substantially corresponding to the desired band of acoustic waves and employing the filtered waves for exciting the acoustic waves within the birefringent medium.

Another feature of the present invention is the same as the immediately preceding feature wherein the band of electromagnetic waves which are filtered from the wider band of electromagnetic waves is tuned to tune the band of acoustic waves and thus the optical band of the acousto-optic filter.

In another feature of the present invention, the optical bandpass intensity characteristic is tailored across the bandpass in a certain non-uniform manner by similarly tailoring the amplitude of the radio frequency acoustic waves across the radio frequency bandpass excited in the photoelastic birefringent medium.

Other features and advantages of the present invention will become apparent upon a perusal of the following specification taken in connection with the accompanying drawings, wherein:

BRIEF DESCRIPTION OF THE DRAWINGS

FIG. 1 is a schematic line diagram, partly in block diagram form, of a acousto-optic filter employing features of the present invention, FIG. 2 is a plot of acoustic wave amplitude vs. acoustic wave frequency depicting the rf bandpass of the acoustic waves excited in the birefringent crystal of the acousto-optic filter of FIG. 1, FIG. 3 is a plot of output light intensity vs. optical frequency depicting the optical bandpass produced by the excitation of acoustic waves within the crystal by the acoustic waves of FIG. 2, FIG. 4 is a plot similar to that of FIG. 2 depicting tailoring of the amplitude characteristic of the radio frequency bandpass of acoustic waves excited in the photoelastic birefringent medium of the acousto-optic filter of FIG. 1; and FIG. 5 is a plot similar to that of FIG. 3 depicting the tailored optical intensity bandpass characteristic for the acoustic excitation of FIG. 4.

DESCRIPTION OF THE PREFERRED EMBODIMENTS

Referring now to FIG. 1, there is shown an acousto-optic filter 1 incorporating features of the present invention. The acousto-optic filter 1 includes a light source 2 which projects a beam of light 3 through a vertical linear polarizer 4 into an optically anisotropic medium 5, such as a photoelastic birefringent crystal of $LiNbO_3$, $PbMoO_4$, $CaMoO_4$ or quartz, having inclined input and output faces 6 and 7, respectively. The beam of light 3 is directed against the input face 6 of the crystal 5 at such an angle that the light beam is diffracted through the crystal 5 in line with the Y axis between the end faces 6 and 7.

The light source 2 may be of any type. For example, it may be a coherent light source, such as that obtained by a laser, or it may be a broadband light source having a uniform spectral power density, such as that produced by a white light source. The light need not be in the visible spectrum. The input vertical polarizer 4 serves to pass only that light from the source 2 which is polarized in a vertical direction, i.e., the Z direction, to provide a polarized input light beam 3. The input light beam enters the input face 6 of the crystal 5 and propagates along a pre-determined axis labeled Y and passes out the opposite face 7 as an output beam 3.

Output beam 3 is passed through a second linear polarizer or polarization analyzer 9, such as a Glan-Taylor or Rochon prism, oriented such that it transmits light with a polarization orthogonal to the polarization of the input beam 3, i.e., polarized in the X direction and reflects light of the same polarization as the input beam.

An acoustic transducer 12 is mounted in intimate contact with the crystal 5 and is connected to a wideband source of rf energy 13 via the intermediary of a tunable and variable bandwidth rf bandpass filter 14. The acoustic transducer 12 is driven by the radio frequency power derived from the wideband source 13 via the tunable filter 14 to simultaneously excite a band of shear acoustic waves $S_1$, which are directed against the inside surface of the input face 6 to be internally reflected therefrom and converted to shear waves $S_2$ which propagate down the Y axis of the crystal generally collinearly with the input light beam 3.

For a particular combination of light wave and acoustic wave frequencies, there is found to be a strong interaction between the light and the acoustic waves in which the light waves are diffracted on the acoustic waves from the polarization orientation of the input beam into the orthogonal polarization. This particular combination of light wave and acoustic wave frequencies can be found from the following relationship:

$$f_o = (c f_a)/(V |\Delta n|) \qquad \text{Eq. (1)}$$

where $c/V$ is the ratio of the light velocity in vacuum to the acoustic velocity of the medium, $\Delta n$ is the birefringence of the crystal 5, $f_o$ is the light wave frequency, and $f_a$ is the acoustic wave frequency.

The expression for the bandwidth of light which is diffracted from the first polarization into the orthogonal polarization is found from the following relation:

$$B.W. \cong 1/|\Delta n| \; L^{cm-1} \qquad \text{Eq. (2)}$$

where B.W. is half power optical bandwith in wavelengths, $\Delta n$ is the birefringence of the crystal, and L is the length of the crystal.

In a typical example of a bandpass filter 1 employing a lithium niobate crystal 5, approximately 5 centimeters long and excited with an acoustic wave of a single frequency, the optical passband has a width of approximately 2A. within the range of 7,000 to 5,500A.

For many applications, an optical passband of 2A. is too narrow and greatly restricts the amount of light that can be put through the filter.

Therefore, the optical bandpass of the acousto-optic filter 1 is increased, in the present invention, by exciting a band of acoustic frequencies, as shown in FIG. 2, to produce a corresponding optical bandpass as shown in FIG. 3. In other words, by varying the width of the bandpass characteristics of the rf bandpass filter 14, the bandpass of acoustic waves excited in the crystal is varied to produce a corresponding variation or tailoring of the desired optical bandpass for the acousto-optic filter 1.

The wideband RF source 13 may be tunable in accordance with tuning of the RF bandpass filter 14 for tuning the acoustic waves over the operating range of acoustic frequencies, to produce a corresponding tunable optical band.

Wideband rf source 13 may comprise, for example, a noise generator or a pulse modulated oscillator with a carrier frequency corresponding to the center of the desired rf bandpass and amplitude or frequency modulated to produce sidebands uniformly distributed and closely spaced. For example, the oscillator would be pulsed with microsecond pulses at a repetition rate of 1 pulse per second to produce a relatively wide band of RF energy with sidebands spaced at one cycle intervals. The tunable and variable rf bandpass filter 14 is then tuned to pass the desired RF bandpass to the transducer 12 to produce the desired optical bandpass characteristics.

The diffracted light beam emerges from the crystal 5 and is passed into the polarization analyzer 9. That portion of the light which has been diffracted from the vertical linear polarization into the horizontal linear polarization within the bandpass of the acousto-optic filter passes straight through the polarization analyzer 9 as cross-polarized output beam 15 having a bandpass characteristic as indicated in FIG. 3. This bandpass characteristic is variable in width and tunable by varying the width and tuning the bandpass characteristics of the RF bandpass filter 14.

The light which has not been diffracted from the vertical polarization into the horizontal polarization but which remains of vertical polarization is reflected from the polarization analyzing prism 9 as output beam 16. Output beam 16 has a band reject or notch filter characteristic with a band width or notch of the reject band determined by the bandwidth of the rf bandpass filter 14. Such a band reject acousto-optic filter is useful for testing certain optical transfer characteristics of multi-channel acoustical devices and for determining cross talk and non-linearities. Such an acousto-optic band reject light filter is disclosed and claimed in copending U.S. application Ser. No. 47,267 filed June 18, 1970, now issued as U.S. Pat. No. 3,644,015, and assigned to the same assignee as the present invention.

Although the acousto-optic filter 1 has been described and shown in the configuration where the light beam passes through the crystal 5 this is not the only possible configuration. More particularly, there is an alternative configuration as disclosed in the aforecited prior art articles in which the acoustic transducer 12 is placed one one end of the crystal 5 and light is directed into the crystal from the opposite end and reflected from an inner face of the transducer such that the input and output optical beams of the acoustooptic filter enter and leave the same face of the crystal. The two light beams are separated by means of a polarizing prism 9 disposed between the light source 2 and the crystal 5. A tunable and variable RF bandpass filter 14 and wideband RF source 13 for exciting acoustic waves in this reflective type of crystal geometry may be employed to advantage for varying the bandpass characteristics of this type of acoustooptic filter.

Referring now to FIGS. 1, 4, and 5, there is shown an alternative embodiment of the present invention. In this embodiment, the intensity I of the output light beam of the acousto-optic filter is tailored (made frequency dependent) across the optical bandpass of the filter (see FIG. 5). This is achieved by producing a similar tailoring (FIG. 4) of the amplitude of the acoustic waves across the radio frequency bandpass as excited in the photoelastic birefringent crystal 5.

The amplitude A of the excited acoustic waves is tailored by similarly tailoring the bandpass characteristics of the radio frequency bandpass filter 14 employing well known conventional radio frequency filter design techniques. Thus, a desired optical bandpass characteristic is readily achieved by producing a corresponding radio frequency bandpass characteristic. In this manner, the solution to a difficult problem at optical frequencies has been translated to the radio frequency regime where solutions are readily available and much easier to implement.

Although FIGS. 4 and 5 depict a linearly increasing amplitude A and intensity I dependence on acoustic and optical frequencies within the bandpass, this is but an example of one of the many possible functions of frequency dependence that are obtainable using this feature of the present invention. In short, other desired functions of frequency dependence are obtainable by merely tailoring the amplitude characteristics of the radio frequency bandpass of filter 14 in the desired manner.

The variable bandpass characteristics or band reject characteristics of the acousto-optic filter are especially useful in monochrometers, spectrophotometers and spectrometers employing such an acousto-optic filter element. More specifically, these variable bandwidth characteristics may be employed for decreasing the resolution of the light passed through the system for increasing the amplitude of the output signal or for obtaining uniform resolution of the light beam over the tunable band of the acousto-optic filter element.

What is claimed is:

1. The method for operating an acousto-optic filter with an optical passband of selectable bandwidth that provides decreased resolution, the method comprising the steps of, exciting in an optically birefringent medium acoustic waves which simultaneously include a plurality of constituent frequencies within a first band of radio frequencies that is selectively variable in proportion to said optical passband of selectable bandwith, collinearly diffracting a beam of light linearly polarized in a first direction on the excited acoustic waves within the birefringent medium to diffract light within the optical passband of selectable bandwith from the first polarization to an orthogonal second polarization, and separating the diffracted light of the first polarization from the diffracted light of the second polarization.

2. The method of claim 1 including the step of tuning the first bandwidth of simultaneously excited radio frequency acoustic waves within the birefringent medium to produce a corresponding tuning of the optical passband of selectable bandwidth diffracted from the first polarization to the second polarization.

3. In an acousto-optic apparatus, an optically birefringent medium disposed to receive a beam of light linearly polarized in a first direction, means for exciting in said biretringent medium acoustic waves which simultaneously include a plurality of constituent frequencies within a selectively variable first band of radio frequencies that is proportional to a passband of optical frequencies of selected bandwith to be diffracted for collinearly diffracting the received light beam on the excited acoustic waves in said birefringent medium to diffract light within said passband of optical frequencies from the first polarization to an orthogonal second polarization, and means for separating the diffracted light of the second polarization from the light of the first polarization.

4. The apparatus of claim 3 including means for tuning the first bandwidth of excited radio frequency acoustic waves within the birefringent medium to produce a corresponding tuning of the passband of optical frequencies of selected bandwidth diffracted from the first polarization to the second polarization.

* * * * *